3,403,819
FEED CONTROL HOPPER
Robert F. Skelton, Bluffton, Ind., assignor to Mix-Mill, Inc., Bluffton, Ind., a corporation of Indiana
Filed Dec. 29, 1966, Ser. No. 605,684
6 Claims. (Cl. 222—56)

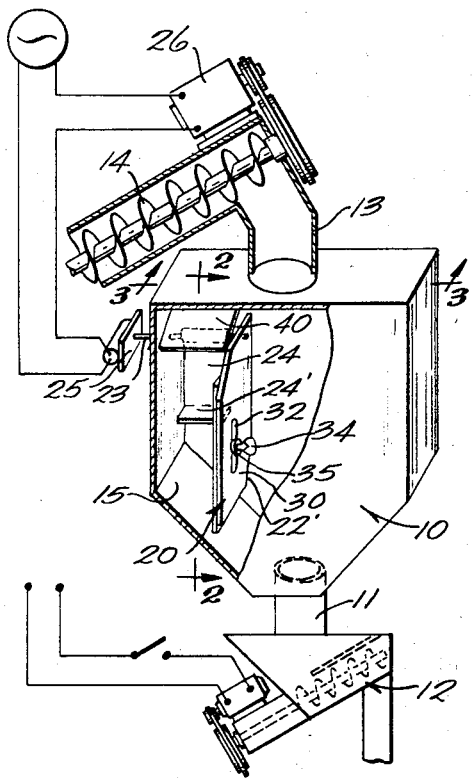
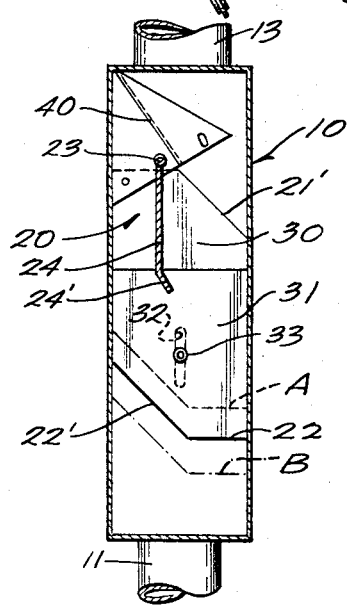
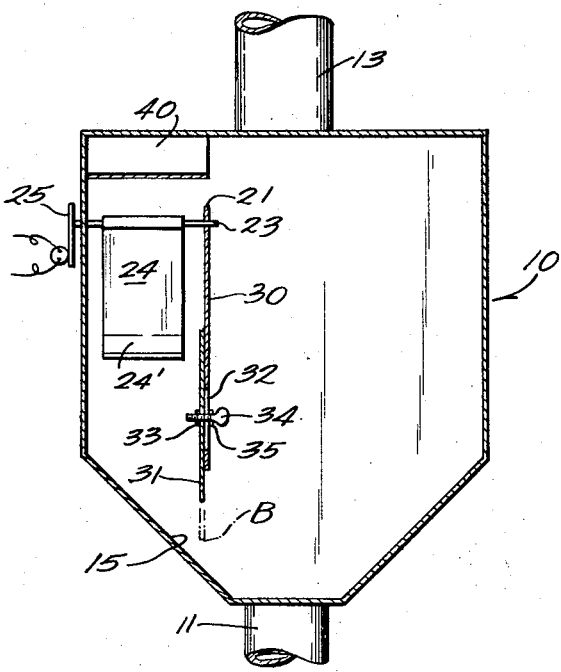

ABSTRACT OF THE DISCLOSURE

A hopper between an infeed conveyor and an outfeed metering conveyor is divided into two sections. The main section is directly between the conveyors. The control section is beside the main section, defined by a partition having top and bottom openings, and contains a switch paddle to control the action of the infeed conveyor. The height of the bottom opening is adjustable.

Cross-reference

This invention is an improvement of the structure shown in Patent No. 3,253,745.

Summary of the invention

The invention consists in making the partition between the sections of the bin adjustable with respect to the height of the opening at the bottom through which material in the control portion flows out to the main bin as it empties. Mechanically the partition comprises two plates, one of which is slidable with respect to the other, the range of adjustment being kept within predetermined limits by providing one of the parts with a pin and the other with a slot to receive the pin, the slot being of a length to permit adjustments within the maximum range required. The pin may be a thumb screw for locking the two plates together in adjusted position.

It further consists in relieving the top margin of the partition to fill the control bin from the wall in front of the paddle switch, and providing a forwardly inclined lower margin on the paddle to prevent material from jamming behind the paddle.

Drawings

FIG. 1 is a perspective view of the conveyors and the bin of my invention, portions of the bin being broken away to show the internal structure.

FIG. 2 is a view on line 2—2 of FIG. 1.

FIG. 3 is a view on line 3—3 of FIG. 1.

Background of the invention

This invention relates to improvements in a delay control hopper and delay control switch for use between a feeding auger and a metering auger to improve the accuracy of the metering auger. It has been found necessary, in order to insure the accuracy of the metering conveyor, to keep the head of material above the metering conveyor within known limits. At the same time, it is extremely undesirable to start and stop the infeed conveyor frequently to keep the supply in the hopper constant, because the motor starting current is very high. This is a very inefficient mode of operation, and it may lead to a short service life for the motor. My Patent 3,253,745 describes such a bin and control switch and all of the drawings and discussion in that patent are applicable here and are incorporated by reference herein.

However, it has been discovered that some forms of materials which may be handled by the said system require that the bottom opening between the main bin and the control bin be varied in size in order to effectively serve the purpose of maintaining smooth flow from the control bin to the main bin and removing the material from behind the paddle of the paddle switch during each cycle. Accordingly, the present invention provides means for varying the height of the lower edge of the partition between the main bin and the control bin. The parts preferably are so arranged as to define upper and lower limits of movement for the lower edge of the partition, so that the useful range of opening heights for the particular materials to be handled are not exceeded.

Description

As shown in FIG. 1, the system to which my invention is applied comprises a bin 10 having a discharge spout 11 to a first metering conveyor 12, which may comprise an auger, and an inlet spout 13 from a second conveyor 14, which may also comprise an auger and which is controlled separately from the first conveyor. The bin is provided with a partition 20 located to one side of the bin 10 from the inlet spout 13 and the outlet spout 11 dividing the bin into a main bin and a control bin. Partition 20, as best shown in FIGS. 2 and 3, has an upper margin 21 well below the top of bin 10 and has a lower margin 22 well above the bottom of the sloping bottom 15 of bin 10 in any position of adjustment.

Partition 20 supports a rod 23, which carries a swingable paddle 24 and switch means 25 which is the circuit to motor 26, the parts being so adjusted that when the paddle 24 is deflected by granular material entering the control portion of bin 10 defined by partition 20, the motor 26 is stopped by the switch. The switch means may be a mercury switch, or may include a mechanical switch and actuator.

Partition 20 consists of a first fixed plate 30 and a second movable plate 31. The upper fixed plate 30 is provided with a slot 32 and the lower movable plate is provided with a fixed nut 33 into which a thumb screw 34 is threaded, the thumb screw having a shoulder 35 broad enough to span slot 32 and thereby secure the movable plate 31 to fixed plate 30 in any position of adjustment permitted by the length of the slot 32. As shown in FIG. 2 the upper position of adjustment of movable plate 31 is shown by line A and the lower position of adjustment is shown by line B.

In the upper portion of the bin a triangular hood 40 keeps the control portion of bin 10 behind paddle 24 free of grain entering from the top. As described in Patent No. 3,253,745, the upwardly relieved lower margin 22' of the movable plate 31 insures that grain will be emptied from behind the paddle 24 in the control portion of the bin before it is emptied from the front paddle 24, and thus ensures that there will be no packing of grain behind the paddle. It is a feature of the present invention that the upper corner 21' of fixed partition 30 is relieved so that filling of the control portion of bin 10 will proceed from a point nearest the side wall of the bin and farthest from paddle 24. Because of the slope that finely divided matter assumes when entering the control bin at the wall, as little as possible of the material being handled by the system enters the control portion of bin 10 before paddle 24 is deflected, and in particular, as little as possible of such material is behind paddle 24, as compared with the amount in front of it. Another feature of the invention is that the lower portion 24' of paddle 24 is inclined forwardly toward the area where the incoming material from the main bin will accumulate in the control portion of the bin. Again, this assures early deflection and provides a relief at the back of paddle 24 which prevents packing of the particulate material being handled by the system. The combination of the inclined portion 24' of the paddle 24, the relieved upper bin partition wall 21', and the adjustability of the lower margin 22-22' of the movable portion 31 of the partition cooperate to greatly improve the operation of the system described in Patent 3,253,745, especially when difficult materials such as bran are being handled.

I claim:

1. In combination with means for maintaining the level of finely divided material between specified levels in a bin, comprising a bin, an opening at the bottom of the bin, a first conveyor adapted to remove material from the bin through said bottom opening, a second conveyor adapted to supply said material to said bin at a defined inlet point a the top of said bin, a generally vertical first partition within said bin dividing said bin into a main bin and a control bin, said bottom opening and said discharge point being within said main bin, said control bin being open to said main bin only at the top and bottom of said first partition, control means for said conveyor, including a switch having a paddle actuator disposed in said control bin, said paddle having a front and a back exposed to the contents of said control bin and being adapted to actuate said switch to the "off" position upon filling of said control bin in front of said paddle beyond a predetermined high level and being adapted to actuate said switch to the "on" position upon emptying of said control bin beyond a predetermined lower level in front of said paddle, means for operating said first conveyor independently of said control means, said paddle being mounted substantially at right angles to said first partition, the lower margin of said first partition extending generally horiontally in the region ahead of said paddle, said first partition having an opening in the region behind said paddle and above the lower margin of said partition, whereby during operation of said first conveyor the material is removed first from the main bin, then from the control bin behind the paddle and lastly from the control bin in front of the paddle;

the improvement comprising said first partition being provided with adjustable lower edge means capable of being fixed in a range of vertically spaced positions, whereby to vary the height of the opening at the bottom of said first partition.

2. The device of claim 1 in which said lower edge means comprises a separate plate comprising the bottom of said first partition and mounted in face contact with the upper portion of said first partition.

3. The device of claim 1 in which said lower edge means is provided with a bore and a nut having a threaded opening which is an extension of said bore, said upper portion of said partition being provided with a thumb screw threaded into said nut and having a portion adapted to bear against the sides of said slot when said screw is tightened to fix said lower adjustable plate in position with respect to said upper part of said first partition.

4. The device of claim 1 in which the upper margin of the partition is downwardly relieved ahead of said paddle, and adjacent the wall of the bin.

5. The device of claim 1 in which said paddle has a normally vertical main portion and a forwardly inclined lower portion.

6. The device of claim 1 in which said lower edge means comprises a separate plate comprising the bottom of said first partition and mounted in face contact with the upper portion of said first partition, said lower edge means being provided with a bore and a nut having a threaded opening which is an extension of said bore, said upper portion of said partition being provided with a thumb screw threaded into said nut and having a portion adapted to bear against the sides of said slot when said screw is tightened to fix said lower adjustable plate in position with respect to said upper part of said first partition, the upper margin of the partition being downwardly relieved ahead of said paddle, and adjacent the wall of the bin, said paddle having a normally vertical main portion and a forwardly inclined lower portion.

References Cited

UNITED STATES PATENTS

| 3,110,420 | 11/1963 | Brewer | 222—56 |
| 3,253,745 | 5/1966 | Skelton | 222—56 |

ROBERT B. REEVES, *Primary Examiner.*

HADD S. LANE, *Assistant Examiner.*